United States Patent
Hoggarth et al.

(10) Patent No.: US 10,625,764 B2
(45) Date of Patent: Apr. 21, 2020

(54) STEERING WHEEL ASSEMBLY

(71) Applicant: FORD GLOBAL TECHNOLOGIES, LLC, Dearborn, MI (US)

(72) Inventors: Marcus Hoggarth, St. Albans Herts (GB); Jasper Dekker, London (GB); Ivan Mark Rogers, High Wycombe (GB); Edward Rose, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 214 days.

(21) Appl. No.: 15/493,708

(22) Filed: Apr. 21, 2017

(65) Prior Publication Data
US 2017/0313341 A1    Nov. 2, 2017

(30) Foreign Application Priority Data
Apr. 28, 2016  (GB) .................................. 1607420.5

(51) Int. Cl.
| | |
|---|---|
| *B62D 1/04* | (2006.01) |
| *B62D 15/02* | (2006.01) |
| *B62D 1/06* | (2006.01) |
| *B62D 5/00* | (2006.01) |
| *B60R 16/027* | (2006.01) |

(52) U.S. Cl.
CPC ................. *B62D 1/06* (2013.01); *B62D 1/04* (2013.01); *B62D 1/046* (2013.01); *B62D 5/005* (2013.01); *B62D 15/02* (2013.01); *B62D 15/022* (2013.01); *B60R 16/027* (2013.01)

(58) Field of Classification Search
CPC . B62D 1/04; B62D 1/046; B62D 1/06; B62D 1/08; B62D 1/11; B62D 5/005; B62D 15/02; B62D 15/022; B60R 16/027; B60Q 1/0082
See application file for complete search history.

(56) References Cited

U.S. PATENT DOCUMENTS

| | | | | |
|---|---|---|---|---|
| 2,491,803 | A  * | 12/1949 | De Heras | B62D 1/06 |
| | | | | 74/558 |
| 4,743,883 | A | 5/1988 | Yoshimi et al. | |
| 6,698,311 | B2 * | 3/2004 | Suzuki | B62D 1/06 |
| | | | | 74/552 |
| 7,044,021 | B2 * | 5/2006 | Lorenz | B62D 1/06 |
| | | | | 318/488 |

(Continued)

FOREIGN PATENT DOCUMENTS

| | | |
|---|---|---|
| CN | 203186396 U | 9/2013 |
| CN | 203356676 U | 12/2013 |

(Continued)

*Primary Examiner* — Adam D Rogers
(74) *Attorney, Agent, or Firm* — David Coppiellie; Brooks Kushman, P.C.

(57) ABSTRACT

A motor vehicle steering wheel assembly may include a ring-shaped member comprising a slot and an internal recess, wherein the slot and internal recess extend circumferentially about the ring-shaped member, the slot being provided in a surface of the ring-shaped member and forming an aperture into the internal recess; a support portion configured to be coupled to a vehicle support structure, the support portion extending through the slot; and a guide portion coupled to the support portion, the guide portion being slidably disposed in the internal recess such that the ring-shaped member is rotatable.

14 Claims, 7 Drawing Sheets

(56) References Cited

U.S. PATENT DOCUMENTS

| | | | | |
|---|---|---|---|---|
| 7,142,963 | B2* | 11/2006 | Borroni-Bird | B60K 37/06 |
| | | | | 701/41 |
| 7,679,495 | B2* | 3/2010 | Beutnagel-Buchner | ...................... |
| | | | | B62D 1/046 |
| | | | | 116/31 |
| 8,327,722 | B2* | 12/2012 | Sasanouchi | G01L 3/104 |
| | | | | 73/862.333 |
| 8,704,652 | B2* | 4/2014 | Sanma | B62D 1/046 |
| | | | | 180/204 |
| 9,481,297 | B2* | 11/2016 | Salter | B62D 1/06 |
| 2010/0175499 | A1 | 7/2010 | Thomas et al. | |
| 2017/0341678 | A1* | 11/2017 | Dekker | B62D 1/04 |

FOREIGN PATENT DOCUMENTS

| | | | | |
|---|---|---|---|---|
| CN | 203358676 U | | 12/2013 | |
| DE | 10308901 A1 | * | 9/2004 | ............... B62D 1/06 |
| DE | 102014206195 A1 | * | 10/2015 | ............... B62D 1/04 |
| EP | 1686039 A1 | | 1/2006 | |
| GB | 527927 A | | 10/1940 | |
| JP | 2007283787 A | | 11/2007 | |
| WO | 2016169684 A1 | | 10/2016 | |

* cited by examiner

STEERING WHEEL ASSEMBLY

CROSS-REFERENCE TO RELATED APPLICATIONS

This application claims foreign priority benefits under 35 U.S.C. § 119(a)-(d) to GB Application 1607420.5 filed Apr. 28, 2016, which is hereby incorporated by reference in its entirety.

TECHNICAL FIELD

This disclosure relates generally to a steering wheel assembly and particularly, although not exclusively, relates to a steering wheel assembly comprising a hubless steering wheel with a circumferentially extending slot for receiving a support portion configured to support the steering wheel.

BACKGROUND

Motor vehicle steering wheels are well known and conventionally comprise a hub to which a steering shaft is attached. However, the steering wheel hub takes up valuable space and obscures a portion of the dashboard that could otherwise be used for display purposes. It is less distracting for the driver to briefly look down at the steering wheel than it is to look at the central console. It is desirable to provide a steering wheel with a more open view.

SUMMARY

According to an aspect of the present disclosure, there is provided a steering wheel assembly, e.g. for a motor vehicle, comprising:

a ring-shaped member comprising a slot and an internal recess, wherein the slot and internal recess extend circumferentially about the ring-shaped member, the slot being provided in a surface of the ring-shaped member and forming an aperture into the internal recess;

a support portion configured to be coupled to a vehicle support structure, the support portion extending through the slot; and a guide portion coupled to the support portion, the guide portion being slidably disposed in the internal recess such that the ring-shaped member is rotatable.

The ring-shaped member may comprise a central axis about which the ring-shaped member may rotate. The slot and internal recess may extend circumferentially about the central axis, e.g. defining a circle. The ring-shaped member may be toroidal. In particular, the ring-shaped member may be a torus, e.g. with a circular cross section in a plane in which the central axis lies.

The steering wheel assembly may be hubless. For example, a void may exist in a centre of the ring-shaped member through which the central axis passes. Accordingly, the central axis may be offset from the support portion. The support portion may be provided at a bottom of the ring-shaped member.

The ring-shaped member may form a steering wheel for a driver of a vehicle to steer. Alternatively, the steering wheel assembly may further comprise a further ring-shaped member. The further ring-shaped member may be coupled to the ring-shaped member, e.g. concentrically. The further ring-shaped member may form a steering wheel for a driver of a vehicle to hold. The further ring-shaped member may be in the same plane as the ring-shaped member or the further ring-shaped member may be in a plane spaced apart from the plane of the ring-shaped member.

The guide portion may be arc shaped. For example, the guide portion may extend about part of the internal recess. Alternatively, the guide portion may be circular and may extend about the circumference of the internal recess.

The steering wheel assembly may further comprise one or more bearings provided between the guide portion and an inner surface of the internal recess.

The support portion and guide portion may be integral or they may be separate components attached together during assembly.

The steering wheel assembly may further comprise one or more sensors configured to determine the rotational position of the ring-shaped member, e.g. relative to the guide portion. The one or more sensors may be configured to determine the position of the ring-shaped member relative to a datum that is fixed or variable between vehicle journeys.

The steering wheel assembly may further comprise one or more lights configured to indicate the direction of vehicle wheels controlled by the steering wheel assembly. The one or more lights may be configured to indicate the current position of the ringed shaped member, e.g. relative to a datum that is fixed or variable between vehicle journeys.

The one or more lights may be provided in the ring-shaped member and/or further ring-shaped member. The one or more lights may extend or may be distributed circumferentially, e.g. around the ring-shaped member or further ring-shaped member. The one or more lights may be arranged in multiple rows. Each row may indicate a complete turn of the ring-shaped member.

Power for the lights may be provided by sliding electrical contacts, e.g. brushes, between the guide portion and the ring-shaped member, or by wireless means, such as electrical induction via cable turns in the guide or support portions and the ring-shaped member. Similarly, control signals for the lights may be provided by sliding electrical contacts, e.g. brushes, between the guide portion and the ring-shaped member, or by wireless means, such as radio waves or electrical induction via cable turns in the guide or support portions and the ring-shaped member.

The steering wheel assembly may further comprise one or more magnets in at least one of the guide portion and ring-shaped member. The sensors may comprise the magnets. The magnets may be configured to selectively apply a force to the ring-shaped member. The force applied to the ring-shaped member may provide feedback to the driver, e.g. the force may simulate feedback that a driver may receive from the road via a conventional directly connected steering wheel. The magnets may move the ring-shaped member, e.g. when the vehicle is in an autonomous or semi-autonomous mode. The magnets may be permanent or electro-magnets, for example, selectively activated electro-magnets may be provided in the guide portion and permanent magnets may be provided in the ring-shaped member. The magnets may be distributed about the guide portion and/or ring-shaped member.

The internal recess may be between radially inner and outer edges of the ring-shaped member. The slot may be provided on a side of the ring-shaped member facing away from a driver of a vehicle when installed in the vehicle.

The slot may be sized such that the guide portion may not be removed from the internal recess during use of the steering wheel assembly.

The ring-shaped member may be assembled from two or more portions that when disassembled allow the guide portion to be placed in the internal recess.

A cross-section of the support portion may be curved where the support portion extends through the slot. The curvature of the support portion may correspond to the curvature of the slot. The curved cross-section of the support portion may allow a narrower slot aperture.

The steering wheel assembly may further comprise a controller configured to determine a steering angle of vehicle wheels controlled by the steering wheel assembly based on the rotational position of the ring-shaped member. The controller may be configured to select a steering ratio between the ring-shaped member and the vehicle wheels controlled by the steering wheel assembly, e.g. based on operational parameters of the vehicle. Such operational parameters may comprise vehicle speed, extent of rotation of the vehicle wheels from the neutral position, rotational position of the ring-shaped member, driving mode etc. The controller may be configured to realign the vehicle wheels controlled by the steering wheel assembly to a neutral position between vehicle journeys, e.g. when the vehicle has been parked or prior to commencing a subsequent journey.

The controller may control the one or more lights mentioned above. The controller may control the one or more magnets mentioned above.

A vehicle, such as a motor vehicle, may comprise the above-mentioned steering wheel assembly.

To avoid unnecessary duplication of effort and repetition of text in the specification, certain features are described in relation to only one or several aspects or embodiments. However, it is to be understood that, where it is technically possible, features described in relation to any aspect or embodiment may also be used with any other aspect or embodiment.

For a better understanding of the present disclosure, and to show more clearly how it may be carried into effect, reference will now be made, by way of example, to the accompanying drawings, in which.

BRIEF DESCRIPTION OF THE DRAWINGS

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
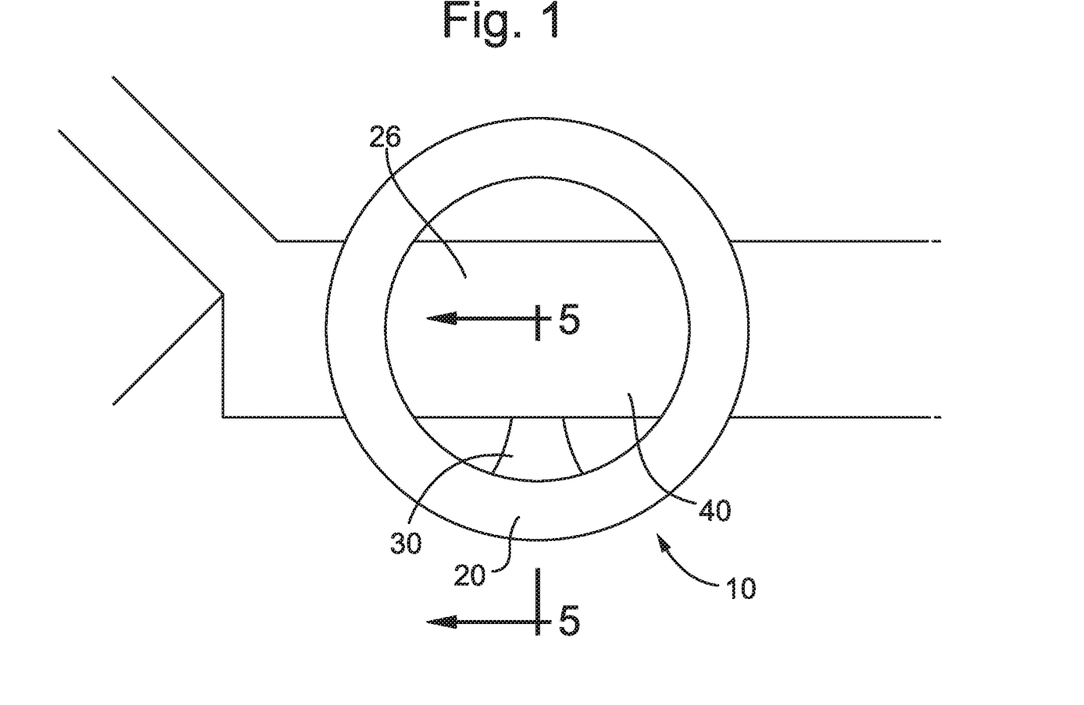
FIG. 1 is a perspective view of a steering wheel assembly according to an example of the present disclosure.
Figure 2:
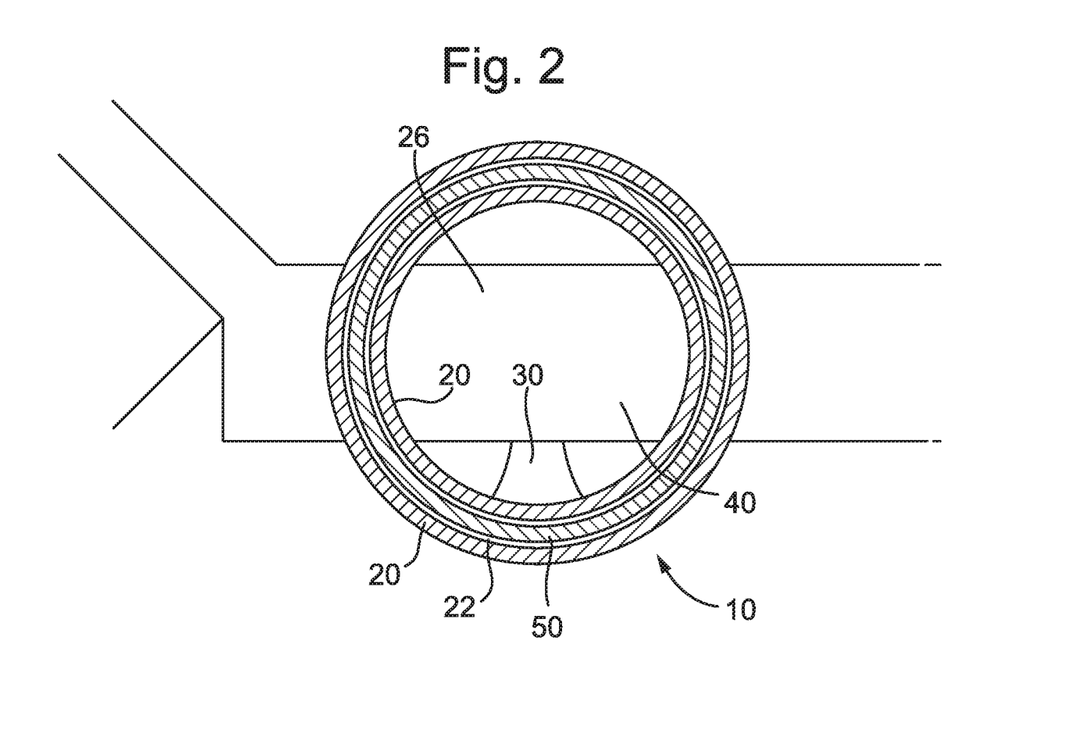
FIG. 2 is a sectional view of a steering wheel assembly according to an example of the present disclosure.

With reference to FIGS. 1 to 5, a steering wheel assembly 10 according to an arrangement of the present disclosure, comprises a ring-shaped member 20 and a support portion 30. The ring-shaped member 20 may form a steering wheel for a driver of a vehicle to hold and steer. The support portion 30 connects the ring-shaped member 20 to a support structure 40 of the vehicle. For example, the support structure 40 may comprise a dashboard or associated structure at the front of a vehicle cabin. As depicted in FIG. 2, the steering wheel assembly 10 further comprises a guide portion 50, which is slidably disposed in hollow interior or an internal recess 22 of the ring-shaped member 20. The guide portion 50 is coupled to the support portion 30 and thus to the support structure 40. Accordingly, the guide portion 50 is rigidly connected to the support structure 40. By contrast, the ring-shaped member 20 may rotate about the guide portion 50.

Figure 5A:
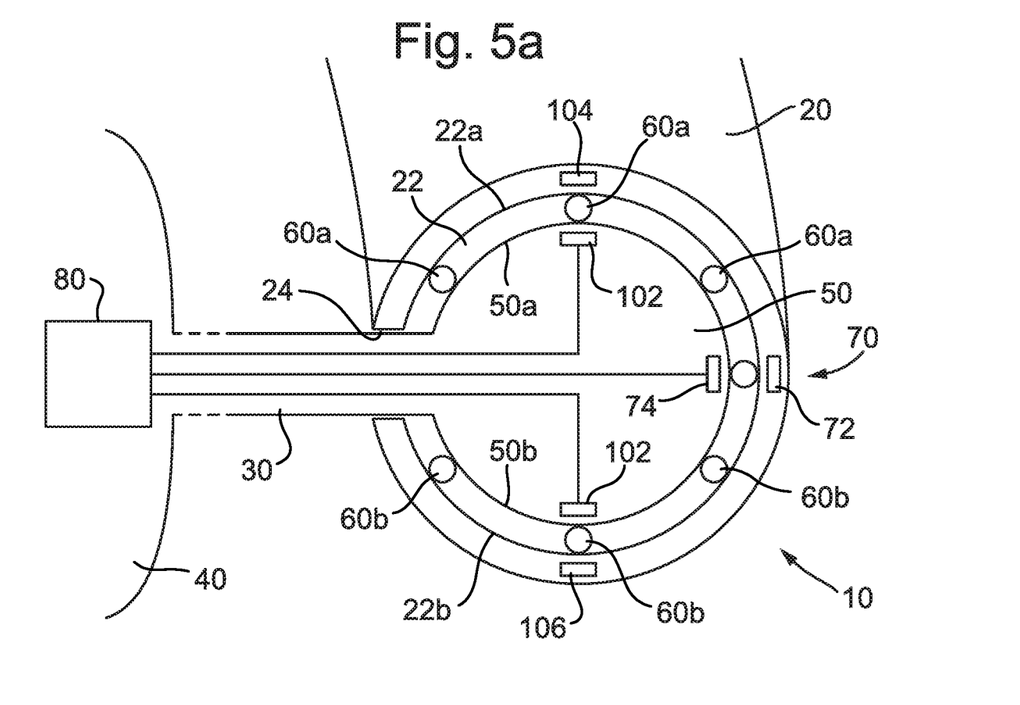
FIGS. 5A and 5B are sectional views of two example internal recess arrangements.
Figure 5B:
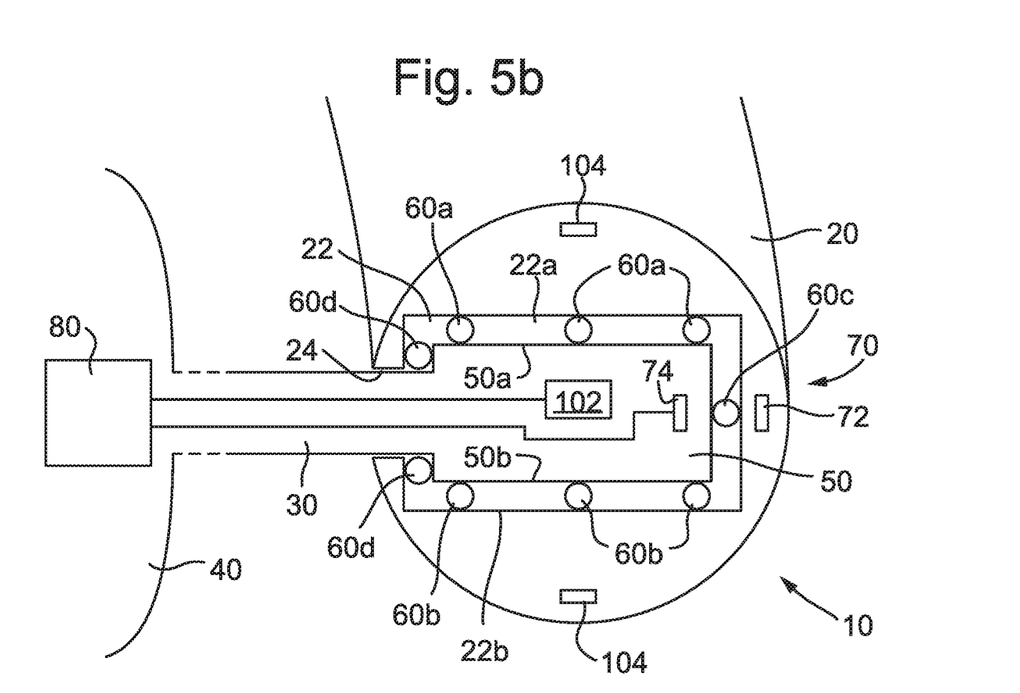

Referring to FIGS. 5A and 5B, the ring-shaped member 20 further comprises a slot 24, which extends circumferentially about the ring-shaped member 20. The slot 24 forms an aperture into the internal recess 22. The support portion 30 extends through the slot 24 and connects to the guide portion 50 in the internal recess 22. The slot 24 may be provided on a side of the ring-shaped member 20 that faces away from a driver of the vehicle. Accordingly, the slot 24 may not be visible to the driver.

The ring-shaped member 20 rotates about a central axis at the center of the ring-shaped member 20. The slot 24 and internal recess 22 extends circumferentially about the central axis so as to define a circle. The ring-shaped member may also be circular and as such may be toroidal. In particular, as will be apparent from FIGS. 5A and 5B, an outer surface of the ring-shaped member 20 may be circular in cross-section such that the ring-shaped member substantially defines a torus. It will be appreciated however that the ring-shaped member may not be circular in cross-section and the cross-sectional shape may also vary about the circumference of the ring-shaped member.

Returning to FIGS. 1 and 2, it will be appreciated that a void 26 may exist at the center of the ring-shaped member 20. Accordingly, the steering wheel assembly 10 may be hubless. The support portion 30 is radially spaced apart from the center of the ring-shaped member 20. The support portion 30 may extend away from the ring-shaped member 20 in a direction with a component parallel to the central axis of the ring-shaped member 20. The support portion 30 may also extend away from the ring-shaped member 20 in a direction with a radial component. In other words, the support portion 30 may extend axially and radially towards or away from the central axis. Alternatively, the support portion 30 may extend in a direction parallel to the central axis.

The steering wheel assembly 10 may be arranged such that the support portion 30 is provided at a bottom of the ring-shaped member 20. The support portion 30 may also extend circumferentially over a portion of the ring-shaped member circumference. For example, the support portion may extend circumferentially so that it subtends an angle of 30° or less about the central axis of the ring-shaped member 20. Where the support portion 30 passes through the slot 24 of the ring-shaped member 20, the support portion 30 may be arcuate in cross-section so as to correspond to the arc of the slot 24.

Figure 3A:
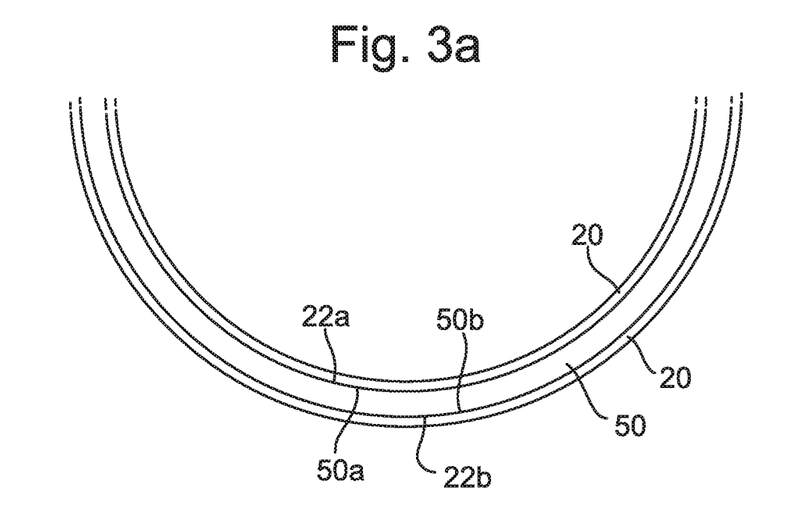
FIGS. 3A and 3B are sectional views of two example bearing arrangements between the guide portion and ring-shaped member.
Figure 3B:
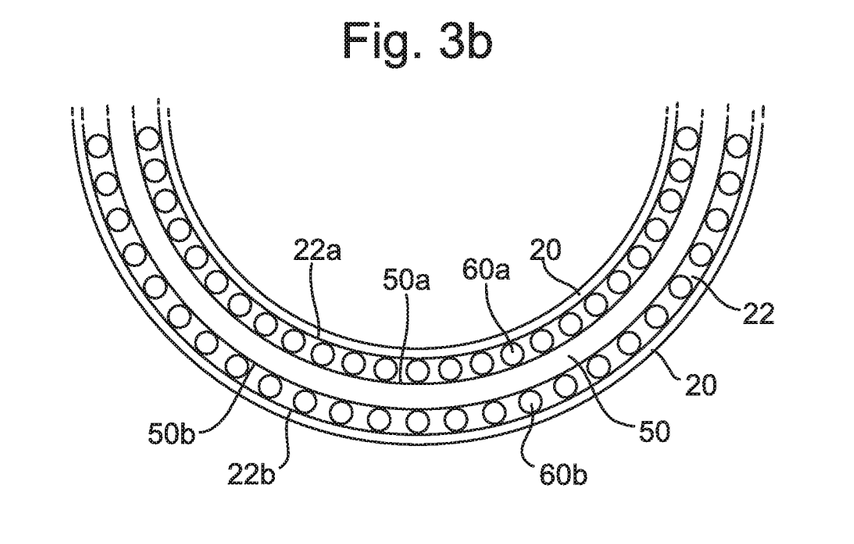

Referring now to FIGS. 3A and 3B, the interface between the guide portion 50 and the ring-shaped member 20 will be described. As shown in FIG. 3A, the guide portion 50 may interface directly with the ring-shaped member 20. In particular, the radial width of the internal recess 22 may correspond to the radial width of the guide portion 50. Accordingly, the ring-shaped member 20 may slidably contact the guide portion 50. In other words, a radially inner surface 22a of the internal recess may slidably contact a radially inner surface 50a of the guide portion and/or a radially outer surface 22b of the internal recess may slidably contact a radially outer surface 50b of the guide portion. Alternatively, as depicted in FIG. 3B, the guide portion 50 may be spaced apart from the radially inner surface 22a and/or the radially outer surface 22b of the internal recess 22. A first row of bearings 60a may be provided between the radially inner surface 22a of the internal recess and the radially inner surface 50a of the guide portion and/or a second row of bearings 60b may be provided between the radially outer surface 22b of the internal recess and the radially outer surface 50b of the guide portion. The bearings 60a, 60b may comprise ball or roller bearings or any other type of bearing assembly. Although not depicted in FIG. 3B, it will be appreciated that the bearings 60a, 60b may be provided within respective races.

Figure 4A:
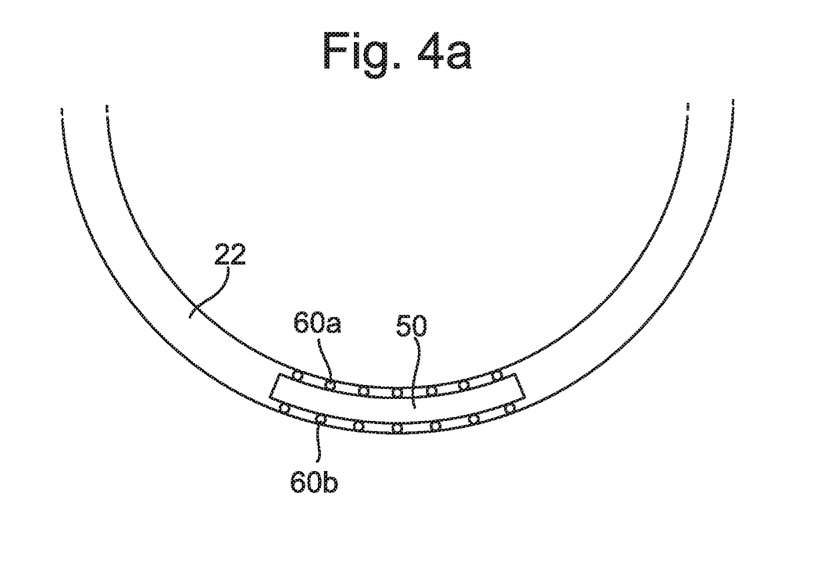
FIGS. 4A and 4B are sectional views of two example guide portion arrangements.
Figure 4B:
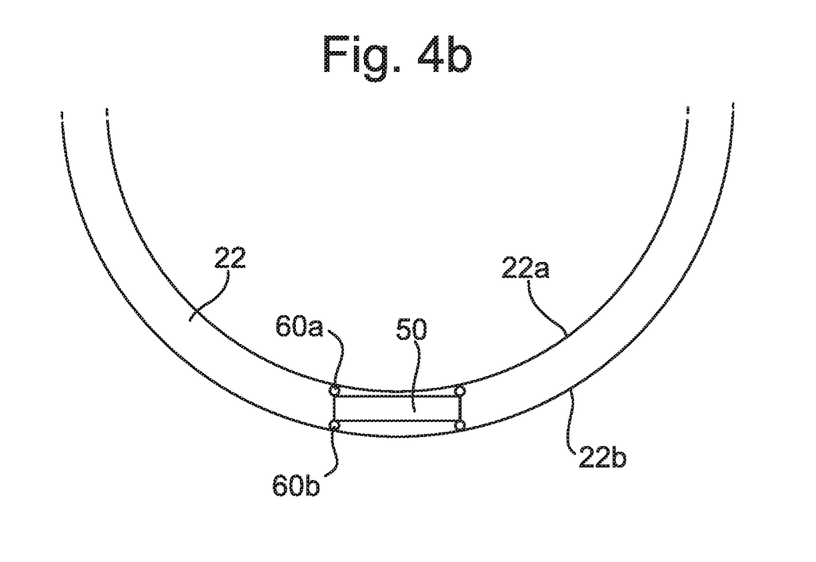

As shown in FIG. 2, the guide portion 50 may extend about the entire circumference of the internal recess 22, such that the guide portion 50 defines a circle. However, as depicted in FIGS. 4A and 4B, the guide portion 50 may not extend about the complete circumference of the internal recess 22. As shown in FIG. 4A, the guide portion may be arcuate with an arc corresponding to the shape of the internal recess 22. As described above with reference to FIGS. 3A and 3B, bearings 60a, 60b may or may not be provided between the guide portion 50 and the walls or outer surfaces 22a, 22b of the internal recess. By contrast, as shown in FIG. 4B, the guide portion 50 may not be arcuate in cross-section and may, for example be rectangular in cross-section. Bearings 60a, 60b may be provided between the guide portion 50 and the radially inner and outer surfaces 22a, 22b of the internal recess.

Referring again to FIGS. 5A and 5B, a cross-sectional view through a plane comprising the central axis is depicted. As shown in FIG. 5A, the internal recess 22 may be circular in cross-section. Similarly, the guide portion 50 may also be circular in cross-section. Additional rows of the first and second bearings 60a, 60b may be provided in the space between the guide portion 50 and the ring-shaped member 20. Distributing the first and second bearings 60a, 60b about the circumference of the gap between the guide portion 50 and inner wall 22a, 22b of the ring-shaped member may help to spread the load on the bearings and may provide bearings that can resist both radial and axial loads. The bearings 60a, 60b depicted in FIG. 5A may be ball bearings. By contrast, the guide portion 50 may not be circular in cross-section and may for example be rectangular in cross-section. Similarly, the internal recess 22 may also not be circular in cross-section and in the example depicted in FIG. 5B may be rectangular in cross-section. Again, multiple rows of first and second bearings 60a, 60b may be provided at axially spaced apart locations. In the example depicted in FIG. 5B the bearings are ball bearings, however, it will be appreciated that the multiple rows of ball bearings depicted in FIG. 5B may be replaced by roller bearings. Thrust bearings 60c, 60d may be provided at end walls of the guide portion 50 and internal recess 22 to reduce frictional forces due to axial loads supplied to the ring-shaped member 20.

Although not depicted, the internal recess 22 and guide portion 50 may have different cross-sectional shapes. Again, although not depicted, a tapered roller bearing may be provided between the guide portion 50 and the radially inner and/or radially outer surfaces of the internal recess. Such a tapered roller bearing may advantageously withstand both radial and axial loads. A pair of opposing tapered roller bearings may be provided to withstand axial loads in either direction. Again, although not depicted, one of the first and second bearing assemblies 60a, 60b may be omitted. A gap may exist between the guide portion 50 and the radially inner or outer surface 22a, 22b where the first or second bearing has been omitted.

As depicted in FIGS. 5A and 5B, the slot 24 is narrower than the internal recess 22 and the guide portion 50 in the radial direction. Accordingly, the ring-shaped member 20 is prevented from moving axially away from the support portion 30. To assemble the steering wheel assembly 10, the ring-shaped member 20 may be formed from two parts, a driver facing part and a dashboard facing part. The guide portion 50 may be provided in the internal recess of one of the parts and the two parts may be brought together to enclose the guide portion 50 in the internal recess 22. The support portion 30 and guide portion 50 may either be separate components to the join together during assembly or they may be unitary. In the case of the ring-shaped member 20 being formed from two or more parts, the ring-shaped member 20 may be covered after assembly of the two parts, e.g., with a leather or similar such material, so as to conceal any joins between the two parts.

The steering wheel assembly 10 may further comprise one or more sensors 70 configured to determine the rotational position of the ring-shaped member 20 relative to the guide portion 50. The steering wheel assembly 10 may form part of a drive-by wire system and a controller 80 may control the directional position of the wheels of the vehicle so as to change the direction in which the vehicle travels. Data from the sensor 70 may be collected by the controller 80 to determine angular movements of the ring-shaped member 20 and the direction of the wheels of the vehicle may be adjusted accordingly. It will thus be appreciated that the steering wheel assembly 10 of the present disclosure may not comprise a hub which is directly connected to a rack and pinion steering system of the vehicle.

The sensors 70 may comprise one or more first sensor portions 72 provided in the ring-shaped member 20 and one or more second sensor portions 74 provided in the guide portion 50. The first and second sensor portions 72 and 74 may cooperate to determine angular movement of the ring-shaped member 20. The second sensor portions 74 may send a signal to the controller 80. By way of example, the first and second sensor portions 72, 74 may comprise magnets, in particular the first sensor portion may be a permanent magnet, whereas the second sensor portion 74 may be an electro-magnet. Alternatively, the second sensor portion 74 may be a wire, e.g., with one or more turns, in which the magnet 72 may induce a current that may then be detected by the controller 80. A plurality of first sensor portions 72 may be distributed about the circumference of the ring-shaped member and/or a plurality of the second sensor portions 74 may be distributed about the circumference of the guide portion 50. The first and second sensor portions 72, 74 may face one another and they may be axially spaced apart as depicted in FIGS. 5A and 5B or radially spaced apart.

As the first sensor portion 72 passes over the second sensor portion 74 a signal may be sent to the controller 80.

The controller 80 may count the number of signals received to determine the angle through which the ring-shaped member 20 has been turned. Alternatively, in the case of there being a plurality of second sensor portions 74 the controller may monitor which of the sensor portions 74 receives a signal to determine the angular position of the ring-shaped member 20. In an alternative arrangement, the sensor 70 may use a light source and a light detector to determine relative movement of the ring-shaped member 20 and guide portion 50. Relative movement of the ring-shaped member 20 and guide portion 50 may change the light from the light source in a way that can be sensed by the light detector so as to determine angular movement of the ring-shaped member 20.

The steering wheel assembly 10 may have a fixed datum, e.g., neutral position, which corresponds to the wheels of the vehicle being in a position such that the vehicle moves in a straight line. Movement of the ring-shaped member 20 relative to the guide portion 50 may be determined relative to this datum by the sensors 70 and controller 80. The datum may be in the form of a marking on the steering wheel assembly which is visible to the driver and indicates the neutral position. Alternatively, the datum position may be represented by one or more lights on the steering wheel assembly, as will be described in more detail below. Alternatively, the steering wheel assembly 10 may not have a fixed datum and the controller 80 may only consider relative movement between the ring-shaped member 20 and the guide portion 50. The datum may be fixed between journeys for the vehicle, e.g., in the manner of a conventional steering wheel, or the datum may be reset between vehicle journeys. For example, the controller 80 may return the wheels of the vehicle to a neutral position between vehicle journeys and the driver of the vehicle would know that the steering wheel assembly 10 starts from a neutral position.

Figure 6:
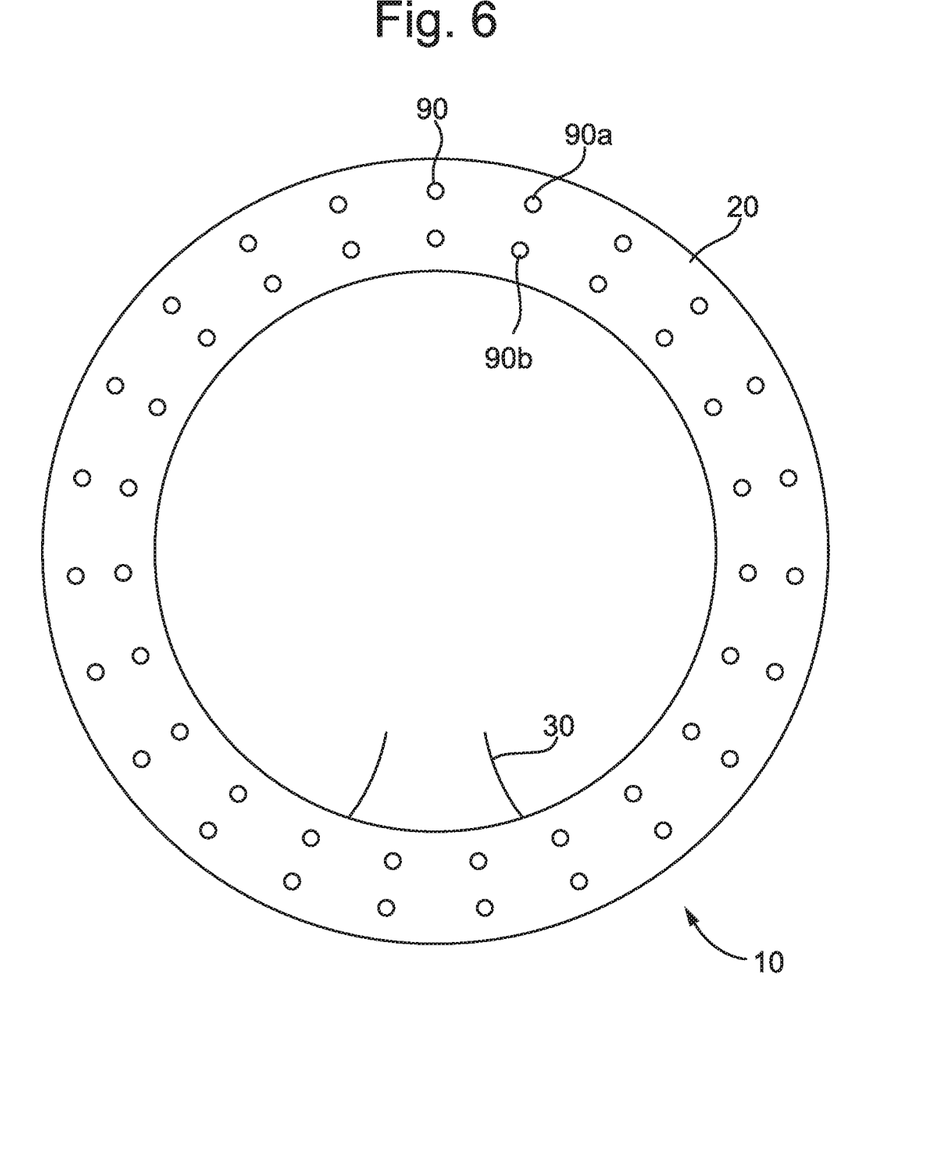
FIG. 6 is a perspective view of a steering wheel assembly according to an example of the present disclosure.

Referring now to FIG. 6, the steering wheel assembly 10 may further comprise one or more lights 90 configured to indicate the direction of vehicle wheels controlled by the steering wheel assembly. The one or more lights 90 may indicate the current position of the ring-shaped member 20 relative to the above mentioned datum that may either be fixed or variable between vehicle journeys. As depicted in FIG. 6, the lights may be provided in the ring-shaped member 20 and may extend circumferentially around the ring-shaped member. In the case of there being a plurality of lights 90, the lights may be distributed about the circumference of the ring-shaped member 20. Alternatively, a single light that extends around the circumference, which may be illuminated along a varying length of the light, may be provided. In order to indicate the number of turns of the ring-shaped member 20, multiple rows of lights may be provided. For example, a first row of lights 90*a* may indicate a first turn of the ring-shaped member and a second row of lights 90*b* may indicate a second turn of the ring-shaped member.

Power for the lights 90 may be provided by sliding electrical contacts, e.g., brushes, between the guide portion 50 and the ring-shaped member 20. Alternatively, power for the lights may be provided by wireless means, such as electrical induction by cable turns in the guide portion 50 and the ring-shaped member 20. Control signals for the lights 90 from the controller 80 may be sent using the same means e.g., the sliding electrical contacts or wireless means. Alternatively, the lights 90 may be provided in the guide portion 50 and a transparent or translucent portion (e.g. circumferential portion) of the ring-shaped member may allow the driver to view the light from the guide portion.

Figure 7:
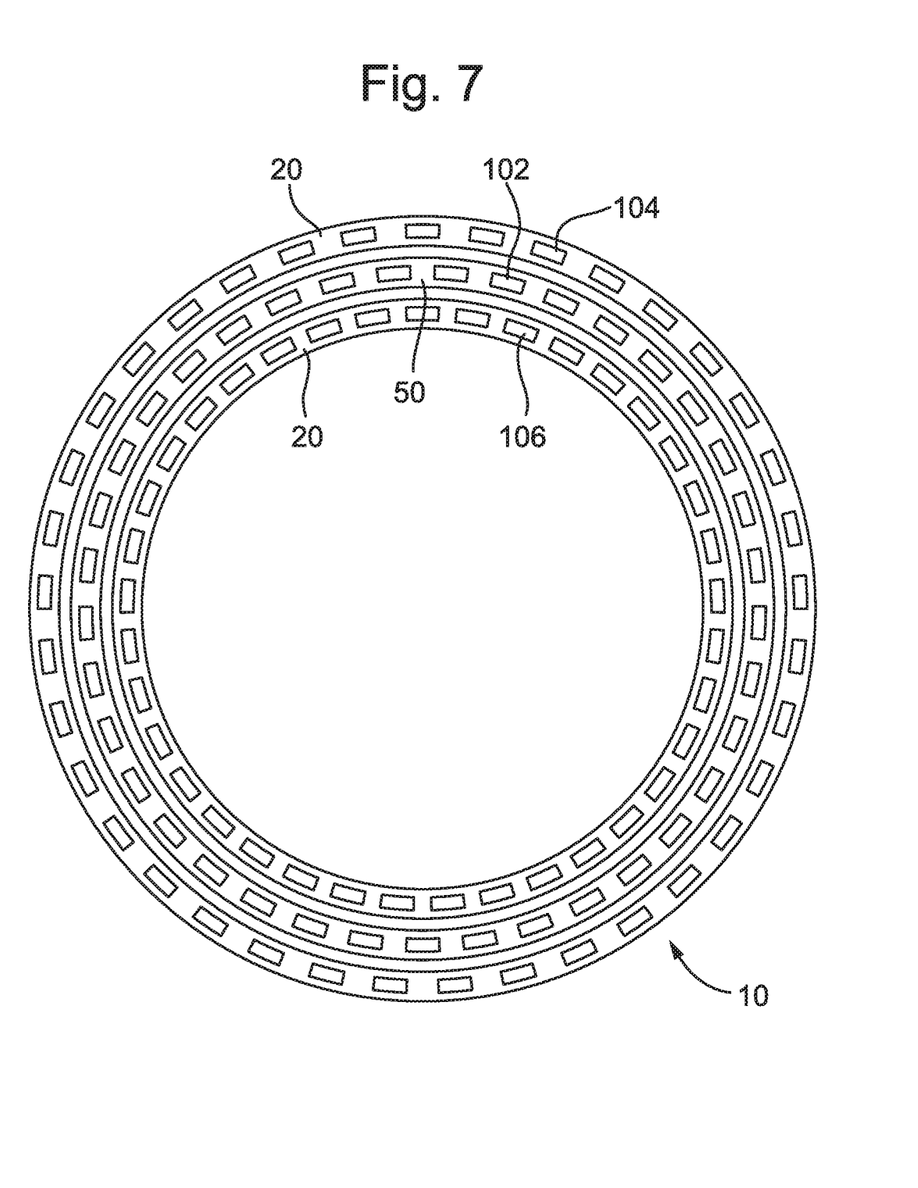
FIG. 7 is a sectional view of a steering wheel assembly according to an example of the present disclosure.

With reference to FIG. 7, the steering wheel assembly 10 may further comprise one or more magnets 102, 104, 106 in at least one of guide portion 50 and ring-shaped member 20. The magnets 102, 104, 106 may form the sensors 70 described above or they may be separate from the sensors 70. The magnets 102 in the guide portion 50 may be distributed about the circumference of the guide portion. Similarly, the magnets 104, 106 in the ring-shaped member 20 may also be distributed about the circumference of the ring-shaped member. The magnets 102, 104, 106 may be permanent magnets or electro-magnets, which may be selectively activated by the controller 80. For example, the magnets 102 and the guide portion 50 may be electro-magnets that are operatively coupled to the controller 80. By contrast, the magnets 104, 106 in the ring-shaped member 20 may be permanent magnets. The electro-magnets 102 in the guide portion 50 may be sequentially activated by the controller 80 in order to apply a force to the ring-shaped member magnets 104, 106. In this way a feedback force may be applied to the ring-shaped member 20, which may simulate feedback that a driver may have otherwise received from a conventional directly connected steering wheel. Sequential operation of the electro-magnets 102 in the guide portion 50 may also serve to rotate the ring-shaped member 20, e.g., if the vehicle is in an autonomous or semi-autonomous mode and it is desired for the steering wheel assembly 10 to rotate as the vehicle is being controlled.

Figure 8A:
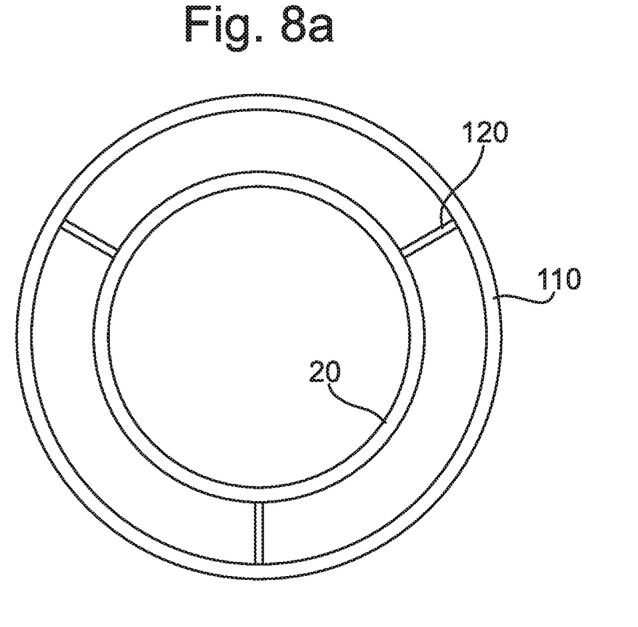
FIG. 8A is a front view of a steering wheel assembly according to an example of the present disclosure.
Figure 8B:
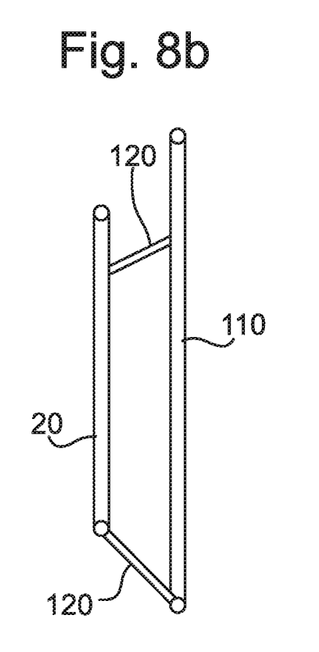
FIGS. 8B and 8C are side views of a steering wheel assembly according to examples of the present disclosure.
Figure 8C:
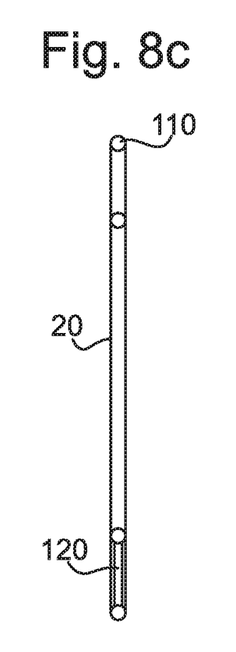

Referring now to FIGS. 8A, 8B and 8C, the steering wheel assembly 10 may further comprise a further ring-shaped member 110 or second ring-shaped member 110. The further ring-shaped member 110 may be connected to the ring-shaped member 20 via one or more arms 120 which extend in a direction with a radial component. The further ring-shaped member 110 may be substantially circular and may be concentric with the ring-shaped member 20, although in an alternative arrangement the further ring-shaped member may not be circular. In the example depicted in FIG. 8A the further ring-shaped member 110 has a larger diameter than the ring-shaped member 20, however, it is also envisaged that the further ring-shaped member 110 may have a diameter smaller than that of the ring-shaped member 20. The further ring-shaped member 110 may form a steering wheel for the driver of the vehicle to hold instead of the ring-shaped member 20. This may allow the driver's hand to move freely past the support portion 30. As depicted in FIG. 8B, the further ring-shaped member 110 may be in a plane that is spaced apart from the plane in which the ring-shaped member 20 resides. In other words, the ring-shaped member 20 and further ring-shaped member 110 may be axially spaced apart. Alternatively, as depicted in FIG. 8C, the further ring-shaped member 110 and ring-shaped member 20 may reside in the same plane. In the case of the ring-shaped member 20 and further ring-shaped member 110 being axially spaced apart, the further ring-shaped member 110 may have the same diameter as the ring-shaped member 20. The lights 90 described above in relation to the ring-shaped member 20 may additionally or alternatively be provided in the further ring-shaped member 110. Power and/or data signals for the lights 90 may be transmitted through the connecting arms 120 to the further ring-shaped member 110.

The controller 80 may be configured to select a steering ratio between the ring-shaped member 20 and the vehicle wheels controlled by the steering wheel assembly 10. The steering ratio may be based on operational parameters of the vehicle, such as the speed of the vehicle, the extent of rotation of the vehicle wheels from the neutral position, the rotational position of the ring-shaped member, a driving mode of the vehicle etc. For example, the steering ratio may have a first value for motorway driving where fine adjustments are required and the steering ratio may have a second value when conducting slow moving manoeuvres, such as parking. As mentioned above, the controller 80 may also be configured to realign the vehicle wheels controlled by the steering wheel assembly to a neutral position between vehicle journeys, e.g. when the vehicle has been parked or prior to commencing a subsequent journey. In this way, the steering wheel assembly need not be provided with an indication of the neutral position of the steering assembly and the driver of the vehicle will know that the wheels of the vehicle are in a neutral position prior to commencing a journey.

The controller 80 may control the lights 90 mentioned above. In particular, the controller 80 may determine from the sensors 70 the angular position of the ring-shaped member 20 and may thus determine which of the lights 90 to illuminate to indicate to the driver the position of the wheels controlled by the steering assembly 10.

It will be appreciated this disclosure is not limited to the disclosed examples and alternative examples may be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A motor vehicle steering wheel assembly comprising:
    a ring-shaped member defining a hollow internal recess and a slot providing an aperture into the internal recess; and
    a guide portion configured to be slidably disposed in the internal recess such that the ring-shaped member is rotatable about the guide portion;
    one or more lights arranged around the ring-shaped member and configured to indicate a current position of the ring-shaped member relative to the guide portion.

2. The steering wheel assembly of claim 1, wherein the guide portion is arc shaped.

3. The steering wheel assembly of claim 1, wherein the guide portion has a circular cross-section and extends about the internal recess.

4. The steering wheel assembly of claim 1, further comprising one or more bearings provided between the guide portion and an inner surface of the internal recess.

5. The steering wheel assembly of claim 1, further comprising a support portion coupled to a vehicle support structure and extending through the slot, wherein the support portion and guide portion are integral.

6. The steering wheel assembly of claim 5, wherein the slot is provided on a side of the ring-shaped member facing the support portion.

7. The steering wheel assembly of claim 1, further comprising one or more sensors configured to determine a rotational position of the ring-shaped member relative to the guide portion.

8. The steering wheel assembly of claim 7, wherein the one or more sensors include magnets.

9. The steering wheel assembly of claim 8, wherein the magnets are configured to selectively apply a force to the ring-shaped member.

10. The steering wheel assembly of claim 1, wherein the one or more lights extend circumferentially about the ring-shaped member.

11. The steering wheel assembly of claim 1, wherein the one or more lights are arranged in multiple rows, each row indicating a complete turn of the ring-shaped member.

12. The steering wheel assembly of claim 1, further comprising a second ring-shaped member coupled to and concentric with the ring-shaped member, wherein the second ring-shaped member forms a portion of a steering wheel.

13. A steering wheel assembly comprising:
    a ring-shaped member defining a hollow internal recess and a slot providing an aperture into the internal recess;
    a guide portion configured to be slidably disposed in the internal recess via the slot allowing rotation of the ring-shaped member about the guide portion while maintaining the ring-shaped member fixed to a support structure; and
    one or more lights arranged around the ring-shaped member and configured to indicate a current position of the ring-shaped member relative to the guide portion.

14. The steering wheel assembly of claim 13, wherein the guide portion has a circular cross-section and extends about the internal recess.

* * * * *